(12) United States Patent
Michiaki et al.

(10) Patent No.: US 8,304,364 B2
(45) Date of Patent: Nov. 6, 2012

(54) COMPLEX OXIDE FOR EXHAUST GAS PURIFICATION CATALYST, PRODUCTION METHOD THEREOF, COATING MATERIAL FOR EXHAUST GAS PURIFICATION CATALYST, AND DIESEL EXHAUST GAS PURIFICATION FILTER

(75) Inventors: Yoshiyuki Michiaki, Okayama (JP); Yoshichika Horikawa, Okayama (JP)

(73) Assignee: Dowa Electronics Materials Co., Ltd., Tokyo (JP)

( * ) Notice: Subject to any disclaimer, the term of this patent is extended or adjusted under 35 U.S.C. 154(b) by 43 days.

(21) Appl. No.: 12/935,701

(22) PCT Filed: Apr. 21, 2009

(86) PCT No.: PCT/JP2009/057915
§ 371 (c)(1), (2), (4) Date: Sep. 30, 2010

(87) PCT Pub. No.: WO2009/131118
PCT Pub. Date: Oct. 29, 2009

(65) Prior Publication Data
US 2011/0027135 A1    Feb. 3, 2011

(30) Foreign Application Priority Data

Apr. 23, 2008    (JP) ................. 2008-112434

(51) Int. Cl.
*B01J 23/10* (2006.01)
*B01J 23/00* (2006.01)
*B01J 23/08* (2006.01)
*B01J 8/02* (2006.01)
*B01J 8/00* (2006.01)
*B01D 53/56* (2006.01)
*B01D 53/94* (2006.01)
*B01D 53/86* (2006.01)
*C01B 21/00* (2006.01)
*C01B 23/00* (2006.01)
*C01B 25/00* (2006.01)
*C01B 31/00* (2006.01)
*C01B 33/00* (2006.01)
*C01B 35/00* (2006.01)
*C01G 28/00* (2006.01)
*C01G 30/00* (2006.01)

(52) U.S. Cl. ........ 502/302; 502/304; 502/349; 502/350; 502/351; 502/355; 423/213.2; 423/239.1

(58) Field of Classification Search ............. 502/302, 502/304, 349–351, 355; 423/213.2, 239.1
See application file for complete search history.

(56) References Cited

U.S. PATENT DOCUMENTS
5,607,892 A    3/1997    Chopin et al.
(Continued)

FOREIGN PATENT DOCUMENTS
CN    1490500    4/2004
(Continued)

OTHER PUBLICATIONS
International Search Report for PCT/JP2009/057915, mailed Jul. 14, 2009.
(Continued)

*Primary Examiner* — Patricia L Hailey
(74) *Attorney, Agent, or Firm* — Greenblum and Bernstein, P.L.C.

(57) ABSTRACT

An oxidation catalyst is provided which is capable of combusting PM in a diesel engine exhaust gas at a low temperature and which has low degradation due to heat generated during combustion (i.e., has high heat resistance).
A composite oxide for an exhaust gas purification catalyst is formed from Ce, Bi, R, R', and oxygen, and when the molar ratios of Ce, Bi, R, and R' are expressed as Ce:Bi:R:R'=(1−x−y−z):x:y:z, it satisfies $0 < x \leq 0.4$, $0 < y < 1.0$, and $0 < z \leq 0.5$. Since this composite oxide has no change in its BET value even when treated at a high temperature, and can withstand a high amount of sulfur poisoning, retrogradation due to poisoning is low. Therefore, this exhaust gas purification catalyst is suitable as a PM combustion catalyst.

13 Claims, 2 Drawing Sheets

U.S. PATENT DOCUMENTS

| | | | |
|---|---|---|---|
| 5,883,037 A * | 3/1999 | Chopin et al. | 502/308 |
| 6,585,944 B1 * | 7/2003 | Nunan et al. | 423/239.1 |
| 8,071,501 B2 * | 12/2011 | Kaneshiro et al. | 502/304 |
| 2004/0053781 A1 | 3/2004 | Okawara | |
| 2009/0288401 A1 * | 11/2009 | Kaneshiro et al. | 60/299 |

FOREIGN PATENT DOCUMENTS

| | | |
|---|---|---|
| JP | 06-211525 | 8/1994 |
| JP | 06-279027 | 10/1994 |
| JP | 06-315634 | 11/1994 |
| JP | 2003-238159 | 8/2003 |
| JP | 2005-281021 | 10/2005 |
| JP | 2006-224032 | 8/2006 |
| WO | 2005/085137 A1 | 9/2005 |
| WO | 2008/050642 * | 5/2008 |
| WO | 2008/065819 * | 6/2008 |

OTHER PUBLICATIONS

Chinese Office Action issued with respect to counterpart Chinese Application No. 200980114888.9, dated Aug. 3, 2012.

* cited by examiner

Fig. 1

Fig. 2 ations.

COMPLEX OXIDE FOR EXHAUST GAS PURIFICATION CATALYST, PRODUCTION METHOD THEREOF, COATING MATERIAL FOR EXHAUST GAS PURIFICATION CATALYST, AND DIESEL EXHAUST GAS PURIFICATION FILTER

TECHNICAL FIELD

The present invention relates to an exhaust gas purification catalyst formed from a complex oxide suited to the combustion of PM (particulate matter) discharged from a diesel engine of an automobile or the like. Further, the present invention relates to a production method thereof, a coating material for a catalyst using such complex oxide, and a diesel exhaust gas purification filter having this coating material coated on a substrate.

BACKGROUND ART

A problem with diesel engine exhaust gas is that nitrogen oxide ($NO_x$) and fine particles mainly consisting of carbon (hereinafter, which may be referred to as "PM") are contained in the exhaust gas, and are a cause of environmental pollution.

A typical method for removing PM is to trap the PM by arranging a diesel particulate filter (DPF) that comprises a porous ceramic in an exhaust gas flow channel.

The PM accumulates in the DPF, and the trapped PM is intermittently or continuously subjected to a combustion treatment to be removed therefrom. Consequently, the DPF can be returned to the state it was in before the PM trapping.

Examples of generally employed methods for this DPF regeneration treatment include a method for combusting PM by forced external heating with an electric heater, a burner or the like, and a method in which an oxidation catalyst is arranged on the side nearer to the engine than the DPF, so that the NO contained in the exhaust gas is converted by the oxidation catalyst into $NO_2$, and the PM is combusted by the oxidative power of the $NO_2$.

However, using an electric heater or a burner requires installation of an external power source. This means that an additional mechanism for maintaining and operating such equipment is necessary, which makes the exhaust gas purification system itself more complicated.

In addition, the oxidation catalyst suffers from various problems, such as the exhaust gas temperature not being high enough for catalytic activity to be sufficiently exhibited, and the NO required for PM combustion not being contained in the exhaust gas unless the system is operated under certain conditions.

As a more preferred DPF regeneration treatment method, a method is being investigated in which the DPF itself is made to support the catalyst, to thereby lower the PM combustion starting temperature due to the catalytic action of the DPF, and then carry out PM combustion.

The ultimate objective which is the most desirable way is a method which achieves continuous PM combustion at the exhaust gas temperature.

Currently, a Pt catalyst metal supported on alumina or the like having a high specific surface area is used as an oxidation catalyst (PM combustion catalyst) for combustion and removal of PM trapped by a DPF.

However, at the exhaust gas temperature level, the catalytic effect of Pt for PM combustion is low. Therefore, continuous PM combustion utilizing the heat of the exhaust gas is considered difficult.

Specifically, external forced heating means is required.

In addition, another problem is that Pt is expensive and causes costs to increase.

Moreover, it can also be assumed that in a PM combustion catalyst, the catalyst temperature may rapidly increase from the heat generated during PM combustion.

Accordingly, there is a need to develop catalyst substances having deterioration (thermal degradation) in catalyst performance as low as possible when exposed to a thermal history at a high temperature.

Patent Documents 1 to 3 disclose, as an oxidation catalyst formed from a base material of a ceria composite oxide free from precious metal elements such as Pt, a mixture including Ce and Bi, and optionally a transition metal element.

A composite oxide formed from Ce and Bi alone, or formed from Ce, Bi, and a transition metal element, releases free Bi when exposed to a high temperature of around 800° C. for a long period of time, because the melting point of the element Bi is low. This causes catalytic activity to deteriorate.

Consequently, there is a need for further improvement regarding heat resistance.

Prior Art Documents

Patent Documents

[Patent Document 1] Japanese Patent Application Laid-Open No. Hei 6-211525
[Patent Document 2] Japanese Patent Application Laid-Open No. 2003-238159
[Patent Document 3] Japanese Patent Application Laid-Open No. 2006-224032

SUMMARY OF THE INVENTION

Problems to be Solved by the Invention

A composite oxide including Ce and Bi has an excellent catalytic activity for decreasing the PM combustion starting temperature.

However, there is the problem that catalytic activity deteriorates when exposed for a long period to the high temperatures of about 800° C. that occur during PM combustion.

Furthermore, there is the problem that catalytic activity also deteriorates due to the trace amount of sulfur oxide included in exhaust gas.

The present invention was achieved in view of such problems in association with the conventional art. It is an object of the present invention to provide a complex oxide for an exhaust gas purification catalyst which has a relatively large specific surface area compared with a conventional composite oxide including Ce and Bi, excellent heat resistance, and a high resistance to S poisoning. Furthermore, it is an object of the present invention to provide a production method thereof, a coating material for an exhaust gas purification catalyst, and a diesel exhaust gas purification filter.

Means for Solving the Problems

As a result of continued intensive research into achieving these objects, the present inventors discovered an exhaust gas purification catalyst that is formed from a complex oxide in which predetermined elements are added to Ce and Bi, thereby completing the present invention.

More specifically, the composite oxide for an exhaust gas purification catalyst of the present invention is formed from Ce, Bi, R (wherein R is one kind or more of lanthanoids excluding La and Ce), and R' (wherein R' is an element selected from Group 3, Group 4, Group 13, or Group 14).

Furthermore, the present invention also provides a coating material including this composite oxide for an exhaust gas purification catalyst, and a DPF formed by coating that coating material on a porous filter.

Advantages of the Invention

A composite oxide formed by adding the above-described R and R' elements to Ce and Bi has a high specific surface area, can avoid sintering among the particles even at high temperatures, and has a small decrease in BET even if exposed to high temperatures.

Specifically, the composite oxide has the advantageous effect that, since it can suppress release of free Bi even at high temperatures, it enables a catalyst having excellent heat resistance to be obtained.

Furthermore, the fact that the composite oxide has a high specific surface area which hardly changes means that the composite oxide has the advantageous effects that a greater S adsorption is possible and deterioration in catalytic activity due to S poisoning can be suppressed.

Thus, the facts that heat resistance is excellent and deterioration in catalytic activity due to S poisoning is low are linked to the advantageous effect of the exhaust gas purification system itself that the system can be used at high temperatures for a long period of time with a stable status.

Furthermore, there is also the advantageous effect that the number of operations for PM removal by combustion treatment carried out by the exhaust gas purification system can be reduced.

BEST MODE FOR CARRYING OUT THE INVENTION

The composite oxide for an exhaust gas purification catalyst of the present invention is a composite oxide which includes at least four elements, R and R' in addition to Ce and Bi.

R is one kind or more of an element of lanthanoids excluding La and Ce. R' is at least one kind or more of an element selected from Group 3, Group 4, Group 13, or Group 14.

By forming in such a manner, excellent catalytic activity can be maintained even if the composite oxide is exposed to an exhaust gas of 800° C. or more for a long period of time.

Furthermore, S poisoning resistance also improves.

Furthermore, the ratio of the elements constituting the composite oxide of the present invention is, when the molar ratios of Ce, Bi, R, and R' are expressed as Ce:Bi:R:R'=(1-x-y-z):x:y:z, preferably $0<x\leq0.4$, $0<y<1.0$, and $0<z\leq0.5$.

If the ratio is not in this range, when $0.4<x$, Bi does not fit into the crystal lattice, so that heat resistance deteriorates.

Furthermore, when $1.0<y$, and $0.5<z$, heterogeneous phases are produced, and the activity derived from a composite oxide having Ce atoms as a main component may not be obtained.

The composite oxide may contain as an impurity phase Bi, R, or R' that does not replace the Ce in the cerium oxide structure. The presence of this impurity phase is permitted to the extent that it does not hinder the effects of the present invention.

If a permissible amount of impurity phase is present, it is sufficient for the molar ratios taken as the whole composite oxide including Ce, Bi, R, or R' in the impurity phase to satisfy the above ranges.

The composite oxide of the present invention is a composite oxide formed from Ce and Bi as base materials. Therefore, the catalytic activity mechanism which allows PM to be combusted from a low temperature can be thought to be the same mechanism that is believed to be the case for conventional Ce—Bi system composite oxides.

Specifically, it is considered that the active oxygen necessary for oxidation is readily supplied from a relatively low temperature range due to cations in the composite oxide mainly composed of Ce atoms undergoing an apparent valence change, and due to Ce sites being substituted with atoms having a different ionic radius than Ce, such as Bi, R, R' or the like, whereby oxygens in the lattice are readily released out of the lattice as a result of lattice strain.

Furthermore, the presence of lattice strain and of R from substitution has the effects of stabilizing the presence of the Bi atoms in the crystal lattice, and of preventing the release of free Bi.

The presence of R' acts as a particle growth inhibitor during synthesis, so that fine particles are produced.

In addition, the presence of R' is thought to prevent sintering among the particles, and thus it is considered that heat resistance against holding at high temperatures for an extended period is increased.

Bi is effective in improving the catalytic activity of oxides having a cerium oxide structure in a low temperature range. Specifically, Bi is effective in lowering the PM combustion starting temperature.

The mechanism for this is considered to be the same as that described above.

Even if the amount of added Bi is comparatively small, an effect in improving catalytic activity in a low temperature range is still produced.

However, if the added amount of Bi is too high, the effect does not improve by that amount. Conversely, the catalyst substance may melt when exposed to high temperatures.

This is believed to be caused by the melting point of the complex oxide decreasing due to the addition of the low-melting-point Bi.

A suitable range for the Bi added amount can be found based on the PM combustion starting temperature of a sample after exposure to a high temperature for a long period of time, and changes in the crystal structure.

Investigations carried out based on such an evaluation showed that, as described above, the blend ratio of Bi in the composite oxide is preferably in the range of $0<x\leq0.4$.

If x is greater than 0.4, the PM combustion starting temperature of the sample after exposure to a high temperature for a long period of time increases.

In this case, the Bi atoms tend to separate from the fluorite structure to form a heterogeneous phase, such as a Bi oxide or a composite oxide of Bi and an additive element. Consequently, the produced composite oxide may contain an impurity phase in an amount that hinders the effects of the present invention.

The present invention provides a novel complex oxide in which R (one kind or more of lanthanoids excluding La and Ce) as a ternary element and R' (one kind or more of elements selected from Group 3, Group 4, Group 13, and Group 14, excluding lanthanoids and actinoids) as a quaternary element are added.

An excellent effect in improving heat resistance can be obtained even if the added amounts of R and R' are relatively low.

The effect in improving heat resistance is generally maintained even if the added amounts of R and R' are increased.

Accordingly, the blend ratio of R is set, as described above, so as to be in the range of $0<y<1.0$.

However, when the blend ratio of R is large, the PM combustion starting temperature tends to increase. Therefore, it is more preferred to set the blend ratio of R to $0<y\leq0.5$.

As described above, R is formed from lanthanoids excluding La and Ce.

Of these, it is preferred to select a lanthanoid capable of forming an oxide that has a fluorite structure similar to cerium oxide ($CeO_2$).

Selecting such an element makes it easier to maintain a fluorite structure by substituting some of the Ce atoms, so that an exhaust gas purification catalyst having much better heat resistance can be obtained.

Examples of such an element include Pr and Tb.

It is preferred to include as R one or both of Pr and Tb. It is more preferred that all of R is formed from one or both of Pr and Tb.

Pr is especially preferred, since Pr can satisfy a good balance of a decrease in PM combustion starting temperature and improvement in heat resistance.

R' is formed from one kind or more of an element selected from Group 3 (Sc and Y), Group 4 (Ti, Zr, Hf, and Rf), Group 13 (B, Al, Ga, In, and Tl), and Group 14 (C, Si, Ge, Sn, and Pb) excluding lanthanoids and actinoids.

Of these, an element which has an effect in suppressing sintering of primary particles during baking and which is effective in increasing the specific surface area of the composite oxide is preferred.

More specifically, Zr, Al, Y, Si and the like are preferred.

Increase of the specific surface area leads to improved catalytic activity, so that the permissible amount for S poisoning is increased.

This is because the amount of sulfur required to cover the surface of the particles increases.

Therefore, by adding R', an effect in suppressing degradation of catalytic activity especially due to S poisoning can be obtained.

However, if excessive R' is added, the fluorite structure cannot be maintained.

Consequently, when adding R', as described above, it is preferred to limit to in the range of $0<z\leq0.5$, or even to $0<z\leq0.2$.

In addition to this composite oxide, it is also effective to include a platinum group element.

The platinum group element has an effect in promoting the oxidation of the fuel contained in the exhaust gas and of the uncombusted components such as NO and CO.

Moreover, the platinum group element can be expected to have an effect in further lowering the PM combustion starting temperature.

One kind or more of platinum group element (Pt, Rh, Pd, Ir, Ru, and Os) maybe used. Especially, Pt, Rh, and Pd have a large effect in increasing catalytic efficiency.

For example, the platinum group element may be included by incorporating in the composite oxide of the present invention.

Alternatively, the platinum group element may be incorporated in a substance generally used as a catalyst carrier, such as $Al_2O_3$, $TiO_2$ or $SiO_2$, and that substance may be mixed with the composite oxide of the present invention, whereby the composite oxide of the present invention is made to coexist with the platinum group element.

The amount of the platinum group element may be, for example, 0.05 to 5 mass % of the composite oxide of the present invention. If the platinum group element is to be further mixed with the above-described catalyst carrier substance, the content of the platinum group element may be, for example, 0.05 to 5 mass % of the mixture of the composite oxide of the present invention and the catalyst carrier substance.

As a method for evaluating the heat resistance of a PM combustion catalyst when it is exposed to a high-temperature long-term thermal history, it is effective to, for example, subject a composite oxide produced by baking to a high-temperature long-term heat treatment in air (hereinafter, this is referred to as "heat resistance treatment"), then observe the level of change in the catalytic activity with respect to PM between immediately after the baking and after the heat resistance treatment.

The catalytic activity with respect to PM may be evaluated, for example, based on the below-described PM combustion temperature.

When a composite oxide is produced by baking under heat at 800° C. for 2 hours, the composite oxide before exposure to the above-described heat resistance treatment has only been subjected to the thermal history of 800° C. for 2 hours.

In the present description, the difference between the PM combustion temperature of a sample which was subjected to a thermal history of 800° C. for 2 hours and then further subjected to a heat resistance treatment of 800° C. for 100 hours, and the PM combustion temperature of the sample before being subjected to the heat resistance treatment is employed as a heat resistance index $\Delta T$ (° C.).

As a method for evaluating the poisoning resistance of a PM catalyst when it is exposed to sulfur oxide, it is effective to expose the produced PM catalyst for a predetermined time to a trace amount of sulfur gas, and observe the changes in catalytic activity.

Catalytic activity is similarly evaluated based on PM combustion temperature.

Further, as the S poisoning rate (SV), the average value of the change per hour between the catalytic activity immediately after production (the PM combustion temperature) and the catalytic activity after 5 hours of poisoning, and the change per hour between the catalytic activity immediately after production and the catalytic activity after 10 hours of poisoning is determined.

If the S poisoning rate is slow, this means that long-term catalytic activity does not decrease even under a sulfur environment.

Here, the S poisoning rate SV is expressed by the following formula (1), in which the catalytic activity immediately after production is K (° C.), the catalytic activity after 5 hours of poisoning is H (° C.), and the catalytic activity after 10 hours of poisoning is L (° C.).

[Equation 1]

$$SV = \frac{\left(\frac{H-K}{5}\right) + \left(\frac{L-K}{10}\right)}{2} \quad (1)$$

As the Sulfur retrogradation degree (SRd), the average of the ratio of the catalytic activity (° C.) after 5 hours of S poisoning with respect to the catalytic activity (° C.) immediately after production and the ratio of the catalytic activity (° C.) after 10 hours of S poisoning with respect to the catalytic activity (° C.) immediately after production is calculated.

The large Sulfur retrogradation degree (SRd) means that the rate of change due to poisoning with respect to the catalytic activity immediately after production is large.

The Sulfur retrogradation degree (SRd) is expressed by the following formula (2) with the same variables as those described above.

[Equation 2]

$$SRd = \frac{\left(\frac{H-K}{K} \times 100\right) + \left(\frac{L-K}{K} \times 100\right)}{2} \quad (2)$$

The present inventors investigated the relationship between oxide structures, and the heat resistance index ΔT (° C.), the S poisoning rate, and the Sulfur retrogradation degree. Here, the oxide structures were produced by a method of baking composite oxides with various compositions including Ce, Bi, a ternary element, and a quaternary element at 800° C. for 2 hours and then subjected to heat resistance treatment.

The results showed that, due to the addition of the ternary element and the quaternary element, the BET value immediately after production was high, the change in BET value after the heat resistance treatment was low, and consequently, the heat resistance index ΔT was also small.

Furthermore, regarding poisoning retrogradation due to sulfur, it was clear that the S poisoning rate was slow, and that the Sulfur retrogradation degree could be decreased.

The composite oxide to which the invention is directed can be preferably produced by a method of baking a precipitated product obtained in a wet process.

For example, a water-soluble salt of Ce, a water-soluble salt of Bi, a water-soluble salt of R (for example, Pr), and a water-soluble salt of R' (for example, Al) are precipitated with a precipitating agent, and then air is blown into the resultant mixture to cause oxidation.

The precipitate is dried to obtain a "precursor." This precursor is subjected to a heat treatment to produce a complex oxide.

Specifically, an alkali, serving as a precipitating agent, is added to and reacted with an aqueous solution in which a water-soluble salt (for example, a nitrate) of Ce, a water-soluble salt (for example, a nitrate) of Bi, a water-soluble salt (for example, a nitrate) of R, and a water-soluble salt of R' are dissolved. Then, air is blown into the resultant mixture to cause oxidation, whereby an oxide mixture is produced.

The obtained precipitated product is filtrated, washed and dried to obtain a precursor.

The upper limit of the ion concentration of Ce, Bi, R, and R' in the solution in which the precipitate is produced is determined based on the solubility of the salts.

However, too high a concentration in the solution is not preferred, since during stirring a uniform reaction may not occur, which can make the reaction become nonuniform. In addition, the load on the apparatus during stirring may become excessive.

To form the precipitate, it is preferred to use either or both of an alkali hydroxide and an alkali carbonate.

Specifically, preferred examples of the alkali hydroxide include sodium hydroxide, ammonia water and the like. Preferred examples of the alkali carbonate include carbonated water, carbon dioxide gas, sodium carbonate, potassium carbonate, sodium bicarbonate and the like. Alternatively, it is preferred to use a mixture of a component formed from carbonic acid as a main component and ammonia water or the respective water-soluble salt of ammonium, or an ammonium carbonate compound which combines both of these functions, specifically, ammonium carbonate, ammonium bicarbonate and the like.

It is also possible to obtain a precipitate by incorporating urea in a salt solution in advance, then heating the salt solution to decompose the urea to generate ammonia, which makes the salt solution alkaline.

It is preferred that the pH of the solution when the precipitate is produced is controlled in a range of 6 to 11.

The pH is preferably in this range because Bi, Ce, R, and R' may not co-precipitate if the pH is less than 6.

Furthermore, a precipitate can also be obtained by preparing a Ce compound, a Bi compound, an R compound, and an R' compound, which are each hydrolyzable, adding these to water, and hydrolyzing them to form a mixed sol, then aggregating and precipitating the mixed sol.

Examples of the hydrolyzable compounds include alkoxides and β-keto acid salts of the respective metal elements.

Optionally, the obtained precipitate may be filtrated, washed with water, and dried in a vacuum or by aeration to give a precursor.

In such a case, to increase the dewatering effect of the drying, the precipitate may be dried as is immediately after filtration, or may be dried after being granulated into a predetermined shape.

Subsequently, the precursor is, while remaining in a powdery or granular state, heat-treated (baked), for example, at 400 to 1,000° C., and preferably 500 to 850° C., to thereby produce the intended composite oxide.

The atmosphere during the baking is not especially limited, so long as the conditions allow the composite oxide to be produced. For example, an atmosphere of air, nitrogen, argon, or such gases combined with water vapor can be employed.

If a platinum group element is to be incorporated in the composite oxide of the present invention, for example, this can be performed by impregnating an intended amount of a salt or a complex of the platinum group element into a baked composite oxide, then drying and further baking the resultant product.

A coating material for an exhaust gas purification catalyst using the composite oxide of the present invention as an exhaust gas purification catalyst, and a DPF using such a coating material can be produced.

The coating material for an exhaust gas purification catalyst is a coating material which includes a composite oxide for an exhaust gas purification catalyst, a solvent, and an inorganic binder.

Optionally, the coating material for an exhaust gas purification catalyst may also include a dispersant, a viscosity modifier, and a pH adjuster.

Either a polar or a non-polar solvent may be used as the solvent.

Although a solvent having a low boiling point is preferred for rapid drying after coating onto a filter, a water-based solvent may also be used when considering handling.

Specific examples of solvents which may be preferably used include water, isopropyl alcohol, terpineol, 2-octanol, and butyl carbitol acetate.

As the inorganic binder, it is preferred to use a powder of $Al_2O_3$, $TiO_2$, $SiO_2$ or the like.

Since the PM catalyst is exposed to high temperatures, a material which exhibits properties of being stable even under high temperatures is preferred.

The structure of the DPF using the composite oxide of the present invention is not especially limited.

Figure 1:
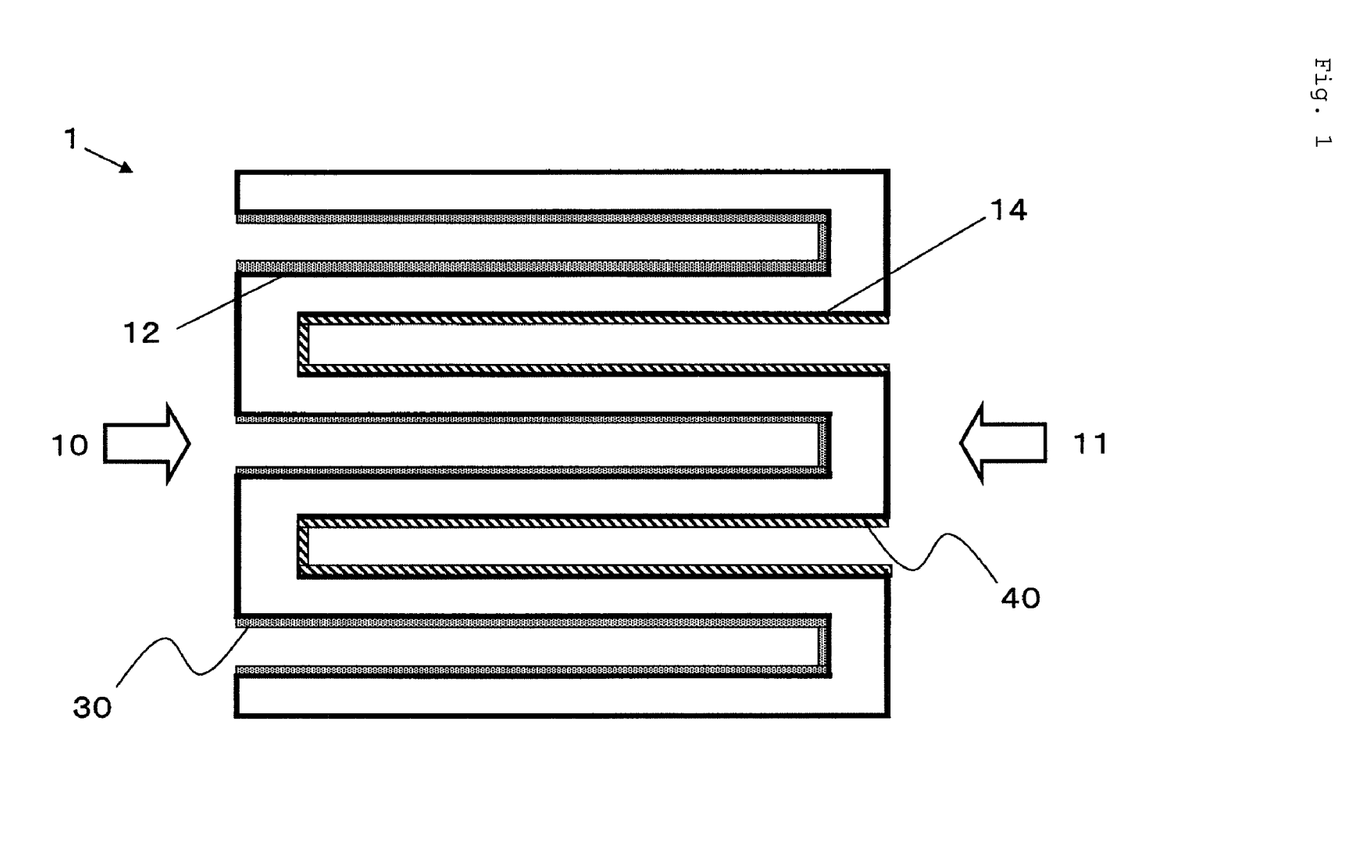
FIG. 1 is a diagram illustrating a structure of a DPF using the composite oxide for an exhaust gas purification catalyst of the present invention.

For example, FIG. 1 illustrates an example of the DPF.

A DPF 1 has a cylindrical shape having a honeycomb structure when viewed from an inlet 10 side. The DPF is configured from a porous ceramic material.

The inlet side (also called "engine side") 10 and an outlet side (also called "air discharge side") 11 do not have a direct through hole, rather the porous ceramic acts as a filter therebetween.

Specific examples of materials which can be preferably used as the porous ceramic include a ceramic, cordierite, silicon carbide, and aluminum titanate.

Further, in addition to the shape illustrated in FIG. 1, shapes such as a foam, a mesh, and a plate may also be employed.

It is preferred to arrange the composite oxide of the present invention on the engine side 10 of the DPF.

This is because, since this is a PM catalyst, if the composite oxide is not on the engine side where the PM accumulates, the PM combustion temperature cannot be decreased.

Furthermore, a platinum group catalyst may also be arranged on the air discharge side with respect to the PM catalyst of the present invention.

For example, a multilayer structure may be employed, in which a layer of a platinum group catalyst and a layer of the PM catalyst of the present invention are each individually coated on a wall face 12 on the engine side of the DPF.

Furthermore, the coating material for an exhaust gas purification catalyst of the present invention may be coated on the wall face 12 on the engine side of the DPF, and a coating material for a platinum group catalyst may be coated on a wall face 14 on the air discharge side.

In this case, a PM catalyst 30 is on the engine side, and a platinum group catalyst 40 is on the air discharge side.

Furthermore, a platinum group catalyst powder may be mixed in the coating material for an exhaust gas purification catalyst of the present invention, and the resultant mixture may be coated.

Here, the term "platinum group catalyst" refers to a catalyst using a platinum group element.

EXAMPLES

Examples will now be described in more detail.
<<Composite Oxide Production>>
The composite oxides of the respective Examples and Comparative Examples were produced as follows.

Example 1

As a Ce source, cerium nitrate hexahydrate ($Ce(NO_3)_3.6H_2O$), and as a Bi source, bismuth nitrate pentahydrate ($Bi(NO_3)_3.5H_2O$) were prepared.

Further, as an R source, a powder of a rare earth oxide Pr oxide was dissolved in concentrated nitric acid solution to prepare a solution of R in nitric acid.

In addition, as an R' source, aluminum nitrate nonahydrate ($Al(NO_3)_3.9H_2O$) was mixed in a blending ratio so that the Ce, Bi, Pr, and R' molar ratios were 0.50:0.09:0.39:0.01. Then, water was added thereto so that the total of Ce, Bi, R, and R' in the mixed nitric acid solution would be 0.2 mol/L, to obtain a starting material solution.

As a precipitating agent, a NaOH aqueous solution was charged into the starting material solution while stirring to obtain a hydroxide precipitate.

Then, the hydroxide was stabilized by thoroughly blowing air at a high temperature of 70° C. or more to form the oxide of the hydroxide.

The obtained precipitate was filtrated, washed with water, and dried at 125° C. for about 15 hours, whereby a dry powder was obtained.

This powder will be referred to as a "precursor."

Next, the precursor was baked in an air atmosphere at 800° C. for 2 hours to obtain a composite oxide including Ce, Bi, and Pr as main components.

Example 2

Similar to Example 1, as a Ce source, cerium nitrate hexahydrate ($Ce(NO_3)_3.6H_2O$), and as a Bi source, bismuth nitrate pentahydrate ($Bi(NO_3)_3.5H_2O$) were prepared.

Further, as an R source, a powder of a rare earth oxide Pr oxide was dissolved in concentrated nitric acid solution to prepare a solution of R in nitric acid.

In addition, as an R' source, yttrium nitrate n-hydrate ($Y(NO_3)_3.nH_2O$) was mixed in a blending ratio so that the Ce, Bi, Pr, and R' molar ratios were 0.49:0.09:0.39:0.03. Then, water was added thereto so that the total of Ce, Bi, R, and R' in the mixed nitric acid solution would be 0.2 mol/L, to obtain a starting material solution.

Then, based on the same steps and under the same conditions as in Example 1, a composite oxide including Ce, Bi, Pr, and R' as main components was obtained.

Example 3

Similar to Example 1, as a Ce source, cerium nitrate hexahydrate ($Ce(NO_3)_3.6H_2O$), and as a Bi source, bismuth nitrate pentahydrate ($Bi(NO_3)_3.5H_2O$) were prepared.

Further, as an R source, a powder of a rare earth oxide Pr oxide was dissolved in concentrated nitric acid solution to prepare a solution of R in nitric acid.

In addition, as an R' source, zirconium oxynitrate dihydrate ($ZrO(NO_3)_2.2H_2O$) was mixed in a blending ratio so that the Ce, Bi, Pr, and R' molar ratios were 0.49:0.09:0.39:0.03. Then, water was added thereto so that the total of Ce, Bi, R, and R' in the mixed nitric acid solution would be 0.2 mol/L, to obtain a starting material solution.

Then, based on the same steps and under the same conditions as in Example 1, a composite oxide including Ce, Bi, Pr, and R' as main components was obtained.

Comparative Example 1

As a Ce source, cerium nitrate hexahydrate ($Ce(NO_3)_3.6H_2O$), and as a Bi source, bismuth nitrate pentahydrate ($Bi(NO_3)_3.5H_2O$) were prepared.

Further, as an R source, a powder of a rare earth oxide Pr oxide was dissolved in concentrated nitric acid solution to prepare a solution of R in nitric acid.

Each of the above-described nitrates and the solution of R in nitric acid were mixed in a blending ratio so that the Ce, Bi, and R molar ratios were 0.5:0.1:0.4. Then, water was added thereto so that the total of Ce, Bi, and R in the mixed nitric acid solution would be 0.2 mol/L, to obtain a starting material solution.

While stirring this solution, an ammonium carbonate aqueous solution was charged thereto as a precipitating agent.

Then, the stirring was continued for 30 minutes to make the precipitation reaction thoroughly proceed.

The obtained precipitate was filtrated, washed with water, and dried at 125° C. for about 15 hours, whereby a dry powder was obtained.

This powder will be referred to as a "precursor."

Next, the precursor was baked in an air atmosphere at 800° C. for 2 hours to obtain a composite oxide including Ce, Bi, and Pr as main components.

Comparative Example 2

As a Ce source, cerium nitrate hexahydrate ($Ce(NO_3)_3 \cdot 6H_2O$), and as a Bi source, bismuth nitrate pentahydrate ($Bi(NO_3)_3 \cdot 5H_2O$) were prepared.

Further, as an R source, a powder of a rare earth oxide Pr oxide was dissolved in concentrated nitric acid solution to prepare a solution of R in nitric acid.

Each of the above-described nitrates and the solution of R in nitric acid were mixed in a blending ratio so that the Ce, Bi, and R molar ratios were 0.5:0.1:0.4. Then, water was added thereto so that the total of Ce, Bi, and R in the mixed nitric acid solution would be 0.2 mol/L, to obtain a starting material solution.

While stirring this solution, sodium hydroxide was charged thereto as a precipitating agent.

Then, based on the same steps and under the same conditions as in Comparative Example 1, a composite oxide including Ce, Bi, and Pr as main components was obtained.

<<Production of Sample for Heat Resistance Evaluation>>

To evaluate the heat resistance of the obtained composite oxides, a part of each composite oxide was heat-treated (subjected to a heat resistance treatment) in air in an electric furnace at 800° C. for 100 hours.

<<Measurement of BET Specific Surface Area>>

Samples obtained in the respective Examples and Comparative Examples before the heat resistance treatment (expressed as 800° C.×2 hrs) and samples after the heat resistance treatment (expressed as 800° C.×100 hrs) were pulverized in an agate mortar to form a powder. These powders were analyzed according to a BET method to determine the specific surface area.

This measurement was carried out using the 4-Sorb US manufactured by Yuasa Ionics Inc.

<<Evaluation of PM Combustion Temperature>>

Samples obtained in the respective Examples and Comparative Examples and samples after the heat resistance treatment were each mixed with carbon black to produce a mixed powder. A predetermined amount of a part of these mixed powders was collected to determine the carbon black combustion temperature using a TG/DTA apparatus. Based on the obtained data, the PM combustion starting temperatures were evaluated.

Specifically, this was carried out as follows.

As a simulated PM, a commercially-available carbon black (manufactured by Mitsubishi Chemical Corporation, average particle size of 2.09 μm) was used. A powder of the composite oxide sample and carbon black were weighted in a mass ratio of 6:1, and mixed in an automatic mortar (AGA Model, manufactured by Ishikawa Kojo) for 20 minutes to obtain a mixed powder of carbon black and the respective sample powders.

20 mg of this mixed powder was set in the TG/DTA apparatus (TG/DTA 6300 Model, manufactured by Seiko Instruments Inc.), and heated from ordinary temperature to 700° C. in air at a rate of temperature increase of 10° C./min to measure the weight loss (since carbon black is discharged out of the system as carbon dioxide due to combustion, from the initial weight there is a deceasing trend).

Figure 2:
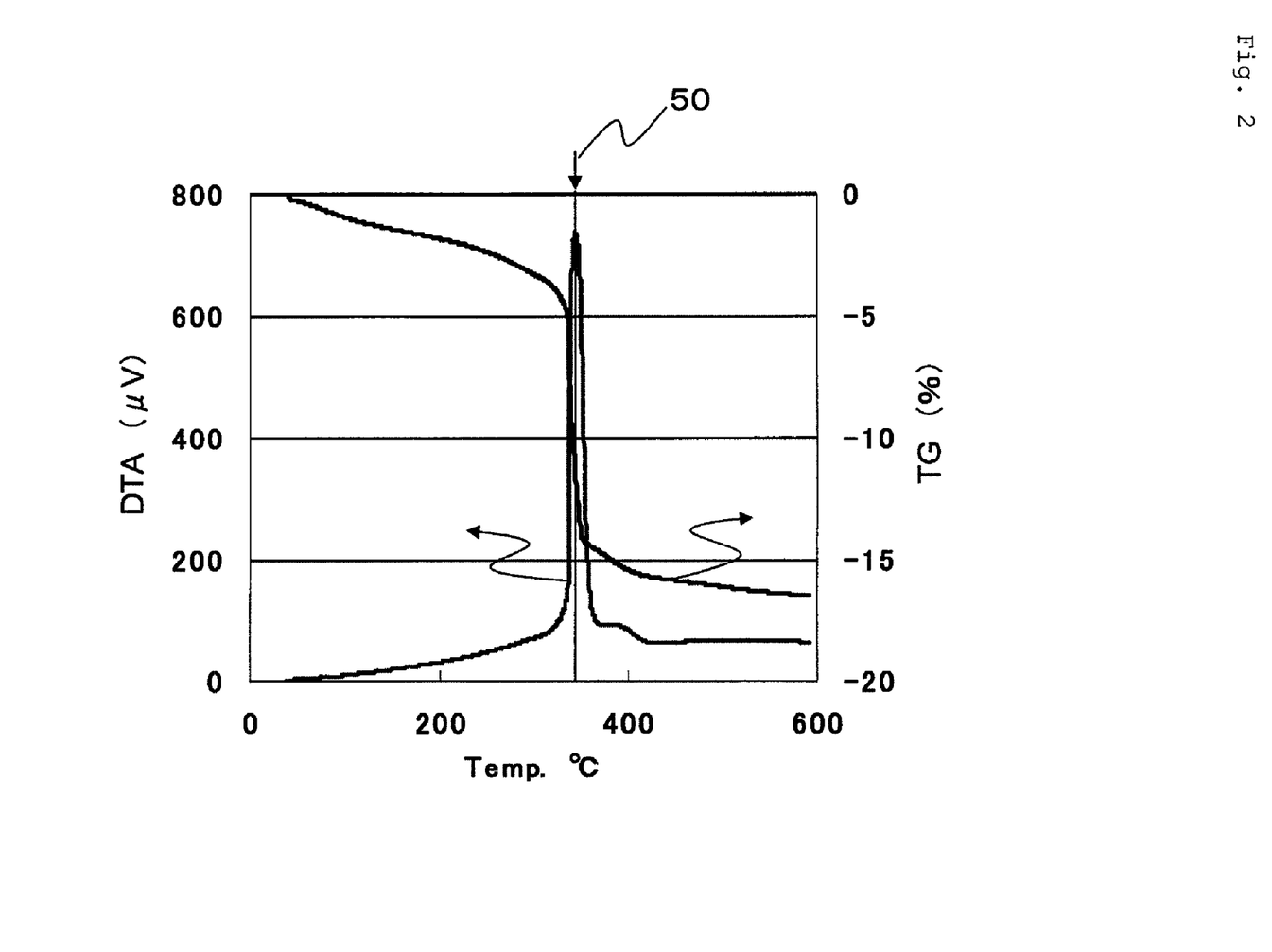
FIG. 2 is a graph of a TG curve.

FIG. 2 graphically shows a thermogravimetric curve (TG curve) and a differential thermal analysis curve (DTA curve).

On the DTA curve, the point at which the heat value is a maximum was taken as the PM combustion temperature.

In FIG. 2, this is the temperature at reference numeral 50.

ΔT was calculated from the difference between the PM combustion temperature of the samples after the heat resistance treatment (expressed as 800° C.×2 hrs) and the PM combustion temperature of the samples before the heat resistance treatment (expressed as 800° C×100 hrs).

This will be called "ΔT heat resistance."

<<Sulfur Poisoning Evaluation>>

Samples obtained in the respective Examples and Comparative Examples were poisoned by leaving for 5 hours and 10 hours in an environment of 10 vol. % concentration $SO_2$ gas at a flow rate of 500 mL/min.

Then, each of the samples was mixed with carbon black to produce a mixed powder. A predetermined amount of a part of these mixed powders was collected to determine the carbon black combustion temperature using a TG/DTA apparatus. Based on the obtained data, the PM combustion temperatures were evaluated.

The difference between the PM combustion temperature of the sample poisoned for 5 hours and the PM combustion temperature before poisoning will be referred to as "ΔT 5H—S treatment," and the difference between the PM combustion temperature of the sample poisoned for 10 hours and the PM combustion temperature before poisoning will be referred to as "ΔT 10H—S treatment."

<<Evaluation of S Poisoning Rate>>

The S poisoning rate (SV) was determined based on the formula (1).

<<Evaluation of Sulfur Retrogradation Degree>>

The Sulfur retrogradation degree (SRd) was determined based on the formula (2).

Here, for Comparative Example 2, since there is no catalytic activity data for the after 5 hours poisoning treatment, the Sulfur retrogradation degree was determined based on the formula (3).

[Equation 3]

$$SRd = \frac{L-K}{K} \times 100 \qquad (3)$$

<<Concerning Measurement Results>>

Table 1 shows the added element molar ratio, the specific surface area, the PM combustion temperature, the S poisoning rate, and the Sulfur retrogradation degree for Examples 1 to 3 and Comparative Examples 1 to 2.

Table 1 shows that the BET of the quaternary catalyst of the present invention immediately after production and after the heat resistance treatment is larger than that of a ternary catalyst (Comparative Examples 1 and 2) composed of Ce, Bi, and Pr.

Comparative Example 2 uses the same production method as the catalyst of the present invention, but the sample does not include R'.

Comparing Comparative Example 2 with Examples 1 to 3, it can be seen that even Example 2, which had the lowest effect of increasing BET (R' was Y), still had a roughly 1 m²/g higher BET than Comparative Example 2.

Both Example 1, which had the highest effect of increasing BET (R' was Al), and Example 3 (R' was Zr), exhibited a BET of 30 m²/g or more even after the heat resistance treatment, at 38.4 m²/g and 32.3 m²/g, respectively.

Comparative Examples 1 and 2 have the same composition, but differed in whether the precipitating agent was ammonium carbonate (Comparative Example 1) or sodium hydroxide (Comparative Example 2). It can be seen that to increase BET, it is preferred to use sodium hydroxide as the precipitating agent.

Next, the influence of S treatment will be shown with reference to "ΔT 5H—S treatment" and "ΔT 10H—S treatment."

However, for Comparative Example 2, there is no data after 5 hours.

First, referring to the "ΔT 5H—S treatment," although Comparative Example 1 showed a value of 67° C., Examples 1 to 3 (19° C. to 29° C.) all showed values lower than 67° C.

Furthermore, for the "ΔT 10H—S treatment" also, Examples 1 to 3 (42° C. to 71° C.) all showed values lower than Comparative Example 1 (115° C.) and Comparative Example 2 (87° C.)

Specifically, these results show that Examples 1 to 3, which have a large BET, are less susceptible to deactivation due to poisoning.

The S poisoning rate is expressed in terms of the level of catalyst deactivation per hour from the perspective of combustion temperature.

Therefore, in view of the above results, Examples 1 to 3 (4.9° C. to 6.0° C.) had a lower S poising rate than the Comparative Examples (8.7° C. and 12.4° C.).

Furthermore, similarly, the Sulfur retrogradation degree acts as an index for the level of deactivation with respect to the initial catalytic activity.

This index also reflects the above-described trend, in which Examples 1 to 3 (10° C. to 13° C.) had a lower Sulfur retrogradation degree than the Comparative Examples 1 and 2 (28° C. and 24° C.)

INDUSTRIAL APPLICABILITY

The present invention can be preferably utilized for a diesel engine exhaust gas filter (DPF).

Description of Reference Numerals
- 1 DPF
- 10 engine side
- 11 air discharge side
- 12 wall face on the engine side
- 14 wall face on the air discharge side
- 30 PM catalyst coated on the wall face on the engine side
- 40 platinum group catalyst coated on the wall face on the air discharge side

The invention claimed is:

1. A composite oxide for an exhaust gas purification catalyst comprising Ce, Bi, R (wherein R is one kind or more of lanthanoids excluding La and Ce), and R' (wherein R' is one kind or more of an element selected from Group 3, Group 4, and Group 13 excluding lanthanoids and actinoids).

2. The composite oxide for an exhaust gas purification catalyst according to claim 1, wherein the R' is an element selected from Al, Zr and Y.

3. The composite oxide for an exhaust gas purification catalyst according to claim 2, wherein the R is Pr.

4. A coating material for an exhaust gas purification catalyst, comprising the composite oxide for an exhaust gas purification catalyst according to claim 3.

5. A diesel exhaust gas purification filter, comprising:
a porous filter;
the composite oxide for an exhaust gas purification catalyst according to claim 3;
an exhaust gas purification catalyst layer including an inorganic binder,
the composite oxide and the exhaust gas purification catalyst layer being formed on the porous filter 6. A coating material for an exhaust gas purification catalyst, comprising the composite oxide for an exhaust gas purification catalyst according to claim 2.

TABLE 1

| | Molar Ratio | | | | Specific Surface Area | | | Combustion Temperature | |
|---|---|---|---|---|---|---|---|---|---|
| | Ce | Bi | Pr | R' | Immediately After Production | After Heat Resistance Treatment | Decreasing Rate (%) | Initial Temp. | After 5H—S Treatment |
| Example 1 | 0.50 | 0.09 | 0.39 | Al 0.01 | 46 | 38.4 | 16.5 | 359 | 378 |
| Example 2 | 0.49 | 0.09 | 0.39 | Y 0.03 | 38.5 | 26.7 | 30.6 | 365 | 395 |
| Example 3 | 0.49 | 0.09 | 0.39 | Zr 0.03 | 42.6 | 32.3 | 24.2 | 361 | 385 |
| Comparative Example 1 | 0.50 | 0.10 | 0.40 | — | 29.9 | 23.5 | 21.4 | 330 | 397 |
| Comparative Example 2 | 0.50 | 0.10 | 0.40 | — | 37.6 | 25.5 | 32.2 | 355 | — |

| | Combustion Temperature | | | Sulfur | |
|---|---|---|---|---|---|
| | After 10H—S Treatment | $\Delta T_{5H-S}$ Treatment | $\Delta T_{10H-S}$ Treatment | S Poisoning Rate (° C./H—S Treatment) | Retrogradation Degree (%) |
| Example 1 | 420 | 19 | 61 | 4.9 | 11 |
| Example 2 | 407 | 29 | 42 | 5.0 | 10 |
| Example 3 | 432 | 25 | 71 | 6.0 | 13 |
| Comparative Example 1 | 445 | 67 | 115 | 12.4 | 28 |
| Comparative Example 2 | 442 | — | 87 | 8.7 | 24 |

7. A diesel exhaust gas purification filter, comprising:
a porous filter;
the composite oxide for an exhaust gas purification catalyst according to claim 2;
an exhaust gas purification catalyst layer including an inorganic binder,
the composite oxide and the exhaust gas purification catalyst layer being formed on the porous filter.

8. The composite oxide for an exhaust gas purification catalyst according to claim 1, wherein the R is Pr.

9. A coating material for an exhaust gas purification catalyst, comprising the composite oxide for an exhaust gas purification catalyst according to claim 8.

10. A diesel exhaust gas purification filter, comprising:
a porous filter;
the composite oxide for an exhaust gas purification catalyst according to claim 8;
an exhaust gas purification catalyst layer including an inorganic binder,
the composite oxide and the exhaust gas purification catalyst layer being formed on the porous filter.

11. A coating material for an exhaust gas purification catalyst, comprising the composite oxide for an exhaust gas purification catalyst according to claim 1.

12. A diesel exhaust gas purification filter, comprising:
a porous filter;
the composite oxide for an exhaust gas purification catalyst according to claim 1;
an exhaust gas purification catalyst layer including an inorganic binder,
the composite oxide and the exhaust gas purification catalyst layer being formed on the porous filter.

13. A method for producing a composite oxide for an exhaust gas purification catalyst, comprising the steps of:
mixing a nitric acid solution of Ce, a nitric acid solution of Bi, a nitric acid solution of said R (wherein R is one kind or more of lanthanoids excluding La and Ce), and a nitric acid solution of said R' (wherein R' is one kind or more of an element selected from Group 3, Group 4, and Group 13 excluding lanthanoids and actinoids) to obtain a mixture solution;
combining an alkali hydroxide and/or an alkali carbonate with the mixture solution to obtain a precipitate.

* * * * *